(12) United States Patent
Silva

(10) Patent No.: US 12,148,292 B2
(45) Date of Patent: Nov. 19, 2024

(54) TRAFFIC MONITORING ASSEMBLY

(71) Applicant: Carlos Silva, S. San Francisco, CA (US)

(72) Inventor: Carlos Silva, S. San Francisco, CA (US)

( * ) Notice: Subject to any disclaimer, the term of this patent is extended or adjusted under 35 U.S.C. 154(b) by 500 days.

(21) Appl. No.: 17/411,822

(22) Filed: Aug. 25, 2021

(65) Prior Publication Data

US 2023/0060818 A1    Mar. 2, 2023

(51) Int. Cl.
| | |
|---|---|
| G08G 1/01 | (2006.01) |
| B60R 9/04 | (2006.01) |
| B60R 11/00 | (2006.01) |
| B60R 11/04 | (2006.01) |
| G01S 13/86 | (2006.01) |
| G01S 15/86 | (2020.01) |
| G01S 17/86 | (2020.01) |
| G01S 19/46 | (2010.01) |

(52) U.S. Cl.
CPC .............. *G08G 1/0112* (2013.01); *B60R 9/04* (2013.01); *B60R 11/04* (2013.01); *G01S 13/862* (2013.01); *G01S 13/865* (2013.01); *G01S 13/867* (2013.01); *G01S 15/86* (2020.01); *G01S 17/86* (2020.01); *G01S 19/46* (2013.01); *B60R 2011/004* (2013.01)

(58) Field of Classification Search
None
See application file for complete search history.

(56) References Cited

U.S. PATENT DOCUMENTS

| | | | |
|---|---|---|---|
| 6,894,717 B2 | 5/2005 | Bakewell | |
| D550,738 S | 9/2007 | Hsia | |
| 10,643,467 B2 | 5/2020 | Alon | |
| 11,729,520 B2 * | 8/2023 | Nie | H04N 23/54 |
| | | | 348/148 |
| 2008/0077312 A1 * | 3/2008 | Mrotek | G08G 1/04 |
| | | | 701/117 |
| 2009/0102921 A1 | 4/2009 | Ito | |
| 2010/0149334 A1 | 6/2010 | Wirsz | |
| 2012/0287278 A1 * | 11/2012 | Danis | G08G 1/0175 |
| | | | 348/148 |
| 2014/0333468 A1 * | 11/2014 | Zhu | G01S 13/867 |
| | | | 342/54 |
| 2022/0075057 A1 * | 3/2022 | Jones, II | G01S 17/86 |
| 2023/0038842 A1 * | 2/2023 | Yu | G06N 20/20 |

* cited by examiner

*Primary Examiner* — Ladimir Magloire
*Assistant Examiner* — Brandon James Henson

(57) ABSTRACT

A traffic monitoring assembly includes a roof rack that is mountable to a roof of a vehicle. A global positioning system transceiver is attached to the roof rack to receive global positioning system coordinates of the vehicle. A laser sensor is attached to the roof rack for detecting the distance between the vehicle and adjacent traffic vehicles traveling on the same roadway as the vehicle. An ultrasonic sensor is attached to the roof rack to capture ultrasonic sound waves reflected from objects near the vehicle. A camera is attached to the roof rack to capture imagery of the environment surrounding the vehicle. A radar sensor is coupled to the roof rack to emit a radar signal for detecting the speed of adjacent traffic vehicles travelling on the same roadway as the vehicle.

7 Claims, 3 Drawing Sheets

TRAFFIC MONITORING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to traffic monitoring devices and more particularly pertains to a new traffic monitoring device for monitoring traffic on public roadways. The device includes a roof rack that is mountable to a roof of a vehicle. The device includes a laser sensor, a global positioning system transceiver, an ultrasonic sensor, a camera and a radar sensor for capturing all possible data pertaining to traffic near the vehicle. Additionally, the device includes a communication transmitter for broadcasting data collected to a data collection center.

(2) Description of Related Art Including Information Disclosed Under 37 CFR 1.97 and 1.98

The prior art relates to traffic monitoring devices including a traffic enforcement device that is positioned inside a police vehicle and which can be aimed in a chosen direction for collecting data of traffic near the police vehicle. The prior art discloses a vehicle analysis device that includes a variety of different cameras each mounted on a law enforcement vehicle for detecting traffic law violations. The prior art discloses a traffic enforcement device that includes a global positioning system system, a radar system and a camera system that are positioned in a law enforcement vehicle. The traffic enforcement includes a computer system that is positioned within the law enforcement vehicle that receives data from the global positioning system system, the radar system and the camera system. The prior art discloses a variety of traffic analysis systems that include a plurality of cameras mounted to a law enforcement vehicle and a data analysis computer that is positioned in the law enforcement vehicle.

BRIEF SUMMARY OF THE INVENTION

An embodiment of the disclosure meets the needs presented above by generally comprising a roof rack that is mountable to a roof of a vehicle. A global positioning system transceiver is attached to the roof rack to receive global positioning system coordinates of the vehicle. A laser sensor is attached to the roof rack for detecting the distance between the vehicle and adjacent traffic vehicles traveling on the same roadway as the vehicle. An ultrasonic sensor is attached to the roof rack to capture ultrasonic sound waves reflected from objects near the vehicle. A camera is attached to the roof rack to capture imagery of the environment surrounding the vehicle. A radar sensor is coupled to the roof rack to emit a radar signal for detecting the speed of adjacent traffic vehicles travelling on the same roadway as the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
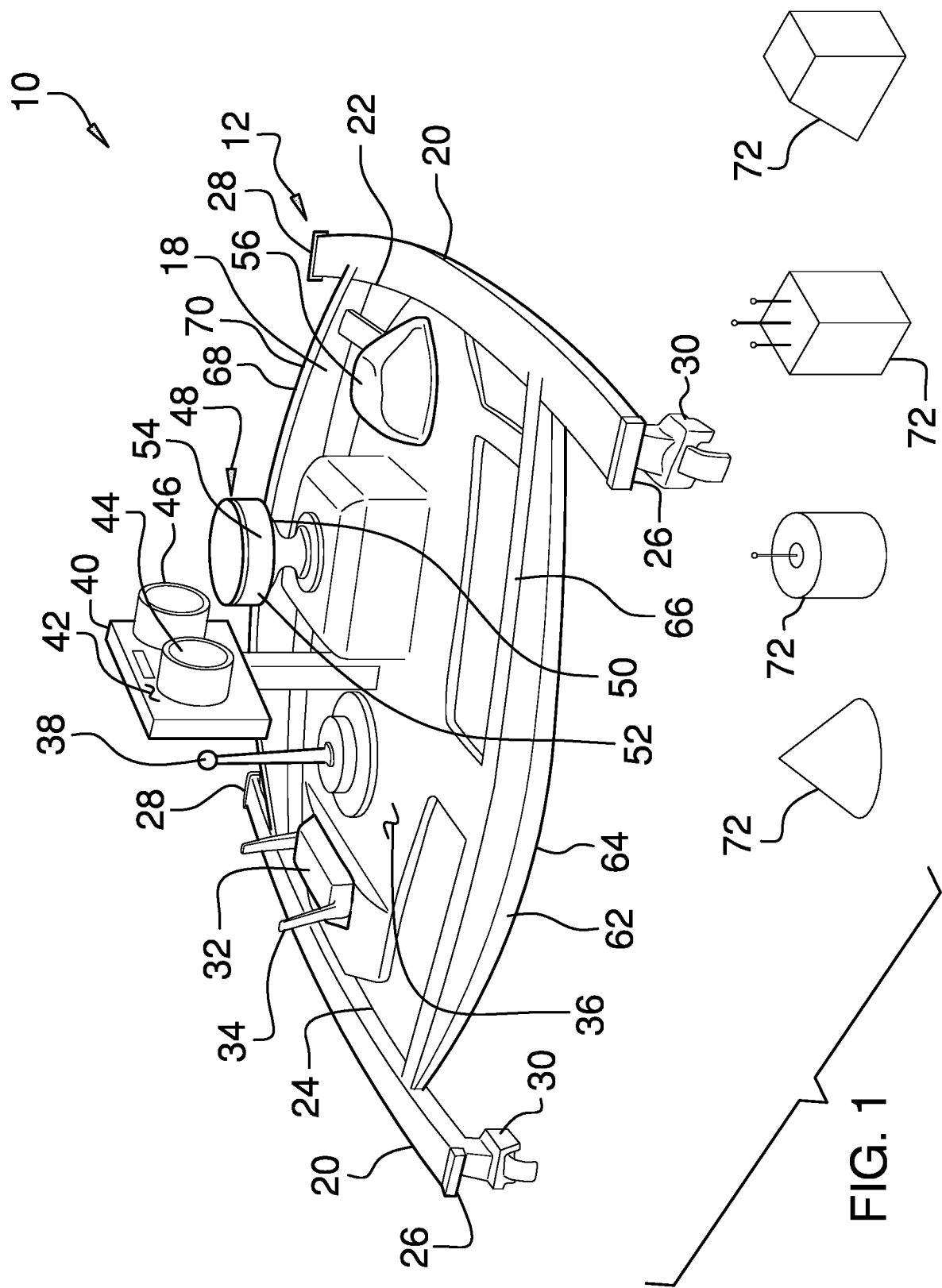
FIG. 1 is a perspective view of a traffic monitoring assembly according to an embodiment of the disclosure.
Figure 2:
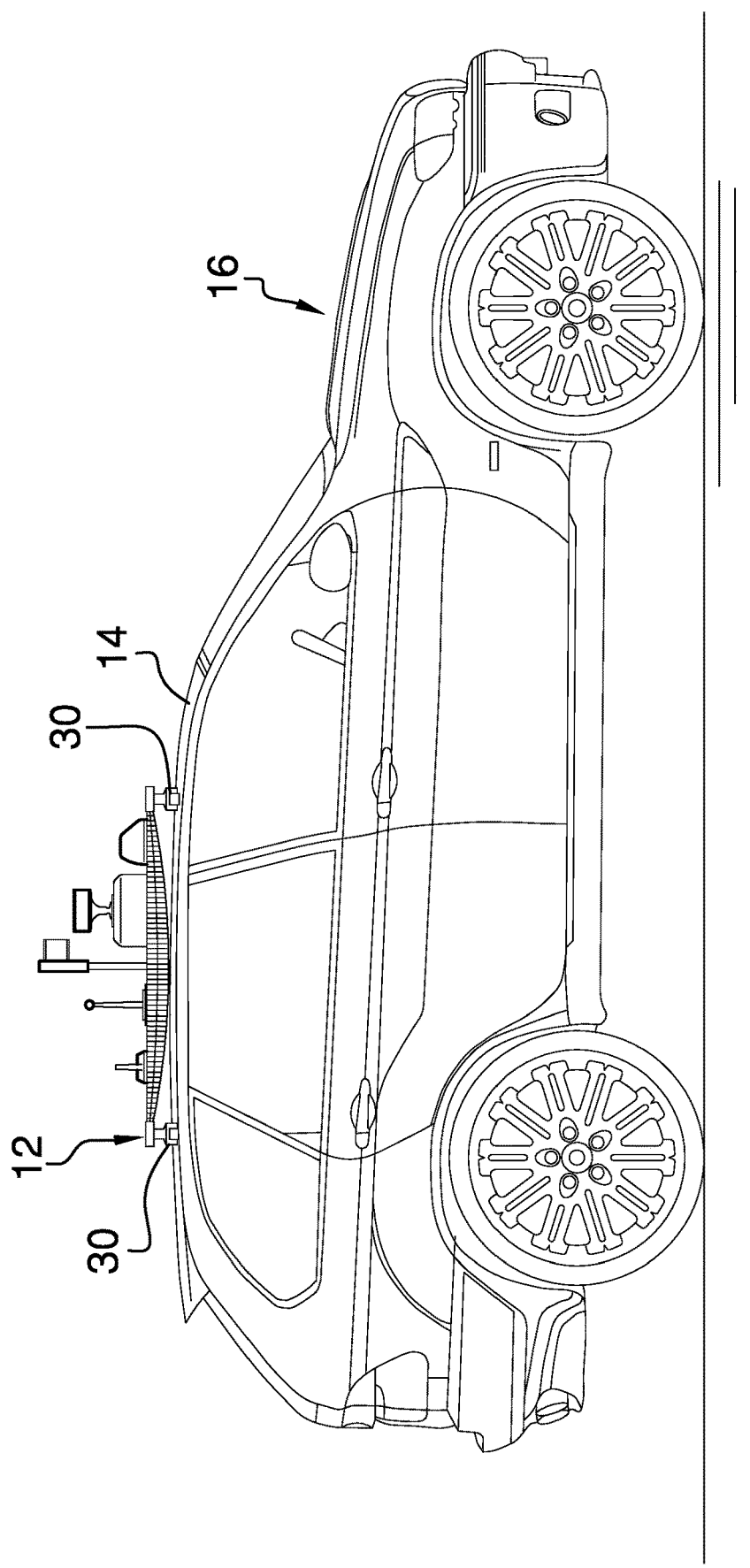
FIG. 2 is a perspective in-use view of an embodiment of the disclosure.
Figure 3:
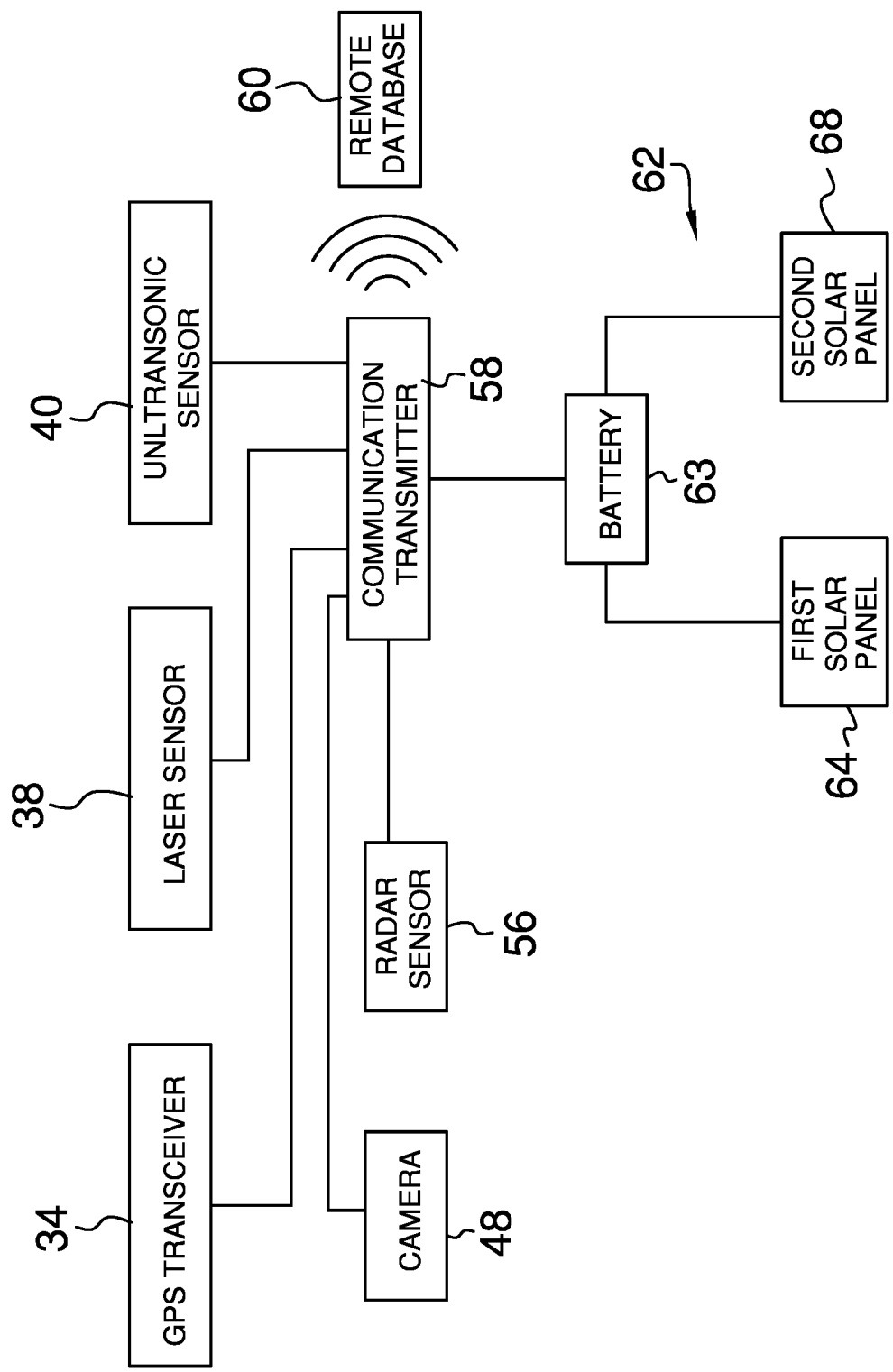
FIG. 3 is a schematic view of an embodiment of the disclosure.

With reference now to the drawings, and in particular to FIGS. 1 through 3 thereof, a new traffic monitoring device embodying the principles and concepts of an embodiment of the disclosure and generally designated by the reference numeral 10 will be described.

As best illustrated in FIGS. 1 through 3, the traffic monitoring assembly 10 generally comprises a roof rack 12 that is mountable to a roof 14 of a vehicle 16 such that the roof rack 12 is exposed. The vehicle 16 may be a passenger vehicle or other type of motorized vehicle that is driven on public roadways. The roof rack 12 includes a panel 18 which extends between a pair of roof engagements 20. Each of roof engagements 20 is positioned on a respective front edge 22 or back edge 24 of the panel 18 and each of the roof engagements 20 extends outwardly beyond the panel 18. Furthermore, each of the roof engagements 20 has a first end 26 and a second end 28, and each of the roof engagements 20 includes a pair of grapples 30. Each of the grapples 30 is positioned on a respective first end 26 and second end 28 of a respective one of the roof engagements 20. Each of the grapples 30 releasably engages the roof 14 of the vehicle 16 for attaching the panel 18 to the roof 14 of the vehicle 16 having the panel 18 lying on a horizontal plane. Each of the grapples 30 may comprise roof mounting mechanisms that are common to existing roof racks of vehicles.

A global positioning system transceiver 32 is attached to the roof rack 12 such that the global positioning system transceiver 32 receives global positioning system coordinates of the vehicle 16 from a global positioning system. The global positioning system transceiver 32 includes a global positioning system antenna 34 that extends upwardly from a top surface 36 of the panel 18 of the roof rack 12. The global positioning system antenna 34 is positioned adjacent to the back edge 24 of the panel 18. The global positioning system transceiver 32 may comprise a radio frequency receiver or the like that is common to global positioning system navigation systems. A laser sensor 38 is attached to the roof rack 12 to emit a beam of laser light from the vehicle 16 for detecting the distance between the vehicle 16 and adjacent traffic vehicles traveling on the same roadway as the vehicle 16. The laser sensor 38 extends upwardly from the top surface 36 of the panel 18 of the roof rack 12. Additionally, the laser sensor 38 is positioned between the global positioning system transceiver 32 and the front edge 22 of the panel 18. The laser sensor 38 may be a laser device that is common to traffic speed detection systems that employ laser detection.

An ultrasonic sensor 40 is attached to the roof rack 12 to emit ultrasonic sound waves from the vehicle 16 thereby facilitating the ultrasonic sound waves to reflect from objects near the vehicle 16. The ultrasonic sensor 40 extends upwardly from the top surface 36 of the panel 18 of the roof rack 12 and the ultrasonic sensor 40 is positioned between the laser sensor 38 and the front edge 22 of the panel 18. The ultrasonic sensor 40 has a forward facing surface 42 that is elevated above the roof rack 12 and that is directed toward the front edge 22 of the panel 18. The ultrasonic sensor 40 has a send horn 44 which is coupled to and extends away from the forward facing surface 42 to emit the ultrasonic sound waves forwardly from the vehicle 16. The ultrasonic sensor 40 has a receiving horn 46 that is coupled to and extends away from the forward facing surface 42 to receive the ultrasonic sound waves that are reflected from the objects hear the vehicle 16. The ultrasonic sensor 40 may comprise an electronic ultrasonic device which has an operational frequency that is in excess of 20,000.0 KHz.

A camera 48 is attached to the roof rack 12 to capture imagery of the environment surrounding the vehicle 16. The camera 48 extends upwardly from the top surface 36 of the panel 18 of the roof rack 12. The camera 48 includes a disk 50 that is spaced upwardly from the panel 18. The disk 50 has an outer edge 52 and the camera 48 includes a lens 54 which extends around the outer edge 52. In this way the lens 54 can capture imagery around 360.0 degrees of the vehicle 16. The camera 48 is positioned between the ultrasonic sensor 40 and the front edge 22 of the panel 18. The camera 48 may comprise a digital video camera or the like.

A radar sensor 56 is coupled to the roof rack 12 to emit a radar signal for detecting the speed of adjacent traffic vehicles travelling on the same roadway as the vehicle 16. The radar sensor 56 extends upwardly from the top surface 36 of the panel 18 of the roof rack 12. Furthermore, the radar sensor 56 is positioned between the camera 48 and the front edge 22 of the panel 18. The radar sensor 56 may comprise an electronic radar emitter that would commonly be employed by police for detecting the speed of vehicles.

A communication transmitter 58 is coupled to the roof rack 12 and the communication transmitter 58 is in communication with each of the global positioning system transceiver 32, the laser sensor 38, the ultrasonic sensor 40, the camera 48 and the radar sensor 56. Additionally, the communication transmitter 58 is in wireless communication with a remote database 60, such as a computer located at a data collection center. In this way the data captured from each of the global positioning system transceiver 32, the laser sensor 38, the ultrasonic sensor 40, the camera 48 and the radar sensor 56 to be stored for subsequent analysis. Moreover, the data collection center may be employed by a traffic safety agency to identify and subsequently prosecute drivers who violate traffic laws on public roadways. The communication transmitter 58 may comprise a radio frequency transmitter or the like that is in communication with a cellular phone network, the internet or other type of wireless communication network.

A power supply 62 is provided and the power supply 62 is integrated into the roof rack 12. The power supply 62 is electrically coupled to each of the global positioning system transceiver 32, the laser sensor 38, the ultrasonic sensor 40, the camera 48, the radar sensor 56 and the communication transmitter 58. The power supply 62 comprises a battery 63 that is attached to the panel 18 of the roof rack 12. The power supply 62 includes a first solar panel 64 that is attached to a first lateral edge 66 of the panel 18 of the roof rack 12 such that the first solar panel 64 is exposed to sunlight. The first solar panel 64 is electrically coupled to the battery 63 for charging the battery 63. The power supply 62 includes a second solar panel 68 that is attached to a second lateral edge 70 of the panel 18 of the roof rack 12 such that the second solar panel 68 is exposed to sunlight. The second solar panel 68 is electrically coupled to the battery 63 for charging the battery 63.

A plurality of telematic devices 72 is included and each of the telematic devices 72 is attachable to the roof rack 12. Additionally, each of the telematic devices 72 performs a unique sensing function with respect to each other thereby facilitating the plurality of telematic devices 72 to enhance the traffic sensing capabilities of the global positioning system transceiver 32, the laser sensor 38, the ultrasonic sensor 40, the camera 48 and the radar sensor 56. Furthermore, each of the telematic devices 72 is placed in communication with the communication transmitter 58 when the telematic devices 72 are attached to the roof rack 12. The plurality of telematic devices 72 may include various electronic devices for performing data gathering duties beyond that which is performed by the global positioning system transceiver 32, the laser sensor 38, the ultrasonic sensor 40, the camera 48 and the radar sensor 56. Each of the telemetric devices 72 may have wireless communication capabilities to facilitate the telemetric devices 72 to communicate with the communication transmitter 58.

In use, the roof rack 12 is mounted to the roof 14 of the vehicle 16 and the vehicle 16 is driven on public roadways. In this way each of the laser sensor 38, the ultrasonic sensor 40, the camera 48 and the radar sensor 56 is can gather data related to the traffic vehicle 16s that are driving on the public roadway. Additionally, a plurality of the vehicles 16 might each be equipped with the roof rack 12 and each of the global positioning system transceiver 32, the laser sensor 38, the ultrasonic sensor 40, the camera 48 and the radar sensor 56. Moreover, each of the plurality of vehicles 16 may be dispatched to drive on various different roadways. In this way the plurality of vehicles 16 can gather traffic data from the various roadways. Moreover, the traffic data can be employed to identify vehicles that are violating traffic laws while driving on the public roadways and to subsequently issue tickets or other penalties relating to violating the traffic laws.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A traffic monitoring assembly for monitoring traffic in real time over a variety of locations, said assembly comprising:
   a roof rack being mountable to a roof of a vehicle wherein said roof rack is configured to be exposed;
   a global positioning system transceiver being attached to said roof rack wherein said global positioning system transceiver is configured to receive global positioning system coordinates of the vehicle;
   a laser sensor being attached to said roof rack wherein said laser sensor is configured to emit a beam of laser light from the vehicle for detecting the distance between the vehicle and adjacent traffic vehicles traveling on the same roadway as the vehicle;
   an ultrasonic sensor being attached to said roof rack wherein said ultrasonic sensor is configured to emit ultrasonic sound waves from the vehicle thereby facilitating the ultrasonic sound waves to reflect from objects near the vehicle;
   a camera being attached to said roof rack wherein said camera is configured to capture imagery of the environment surrounding the vehicle;
   a radar sensor being coupled to said roof rack wherein said radar sensor is configured to emit a radar signal for detecting the speed of adjacent traffic vehicles travelling on the same roadway as the vehicle;
   a plurality of telematic devices, each of said telematic devices being attachable to said roof rack, each of said telematic devices performing a unique sensing function with respect to each other thereby facilitating said plurality of telematic devices to enhance the traffic sensing capabilities;
   wherein said roof rack includes a panel extending between a pair of roof engagements, each of roof engagements being positioned on a respective front edge or back edge of said panel, each of said roof engagements extending outwardly beyond said panel, each of said roof engagements having a first end and a second end, each of said roof engagements including a pair of grapples, each of said grapples being positioned on a respective first end and said second end of a respective one of said roof engagements, each of said grapples releasably engaging the roof of the vehicle for attaching said panel to the roof of the vehicle having said panel lying on a horizontal plane;
   wherein said global positioning system transceiver includes a global positioning system antenna extending upwardly from a top surface of said panel of said roof rack, said global positioning system antenna being positioned adjacent to said back edge of said panel;
   wherein said laser sensor extends upwardly from said top surface of said panel of said roof rack, said laser sensor being positioned between said global positioning system transceiver and said front edge of said panel;
   wherein said ultrasonic sensor extends upwardly from said top surface of said panel of said roof rack, said ultrasonic sensor being positioned between said laser sensor and said front edge of said panel;
   wherein said camera extends upwardly from said top surface of said panel of said roof rack; and
   wherein said radar sensor extends upwardly from said top surface of said panel of said roof rack, said radar sensor being positioned between said camera and said front edge of said panel.

2. A traffic monitoring assembly for monitoring traffic in real time over a variety of locations, said assembly comprising:
   a roof rack being mountable to a roof of a vehicle wherein said roof rack is configured to be exposed;
   a global positioning system transceiver being attached to said roof rack wherein said global positioning system transceiver is configured to receive global positioning system coordinates of the vehicle;
   a laser sensor being attached to said roof rack wherein said laser sensor is configured to emit a beam of laser light from the vehicle for detecting the distance between the vehicle and adjacent traffic vehicles traveling on the same roadway as the vehicle;
   an ultrasonic sensor being attached to said roof rack wherein said ultrasonic sensor is configured to emit ultrasonic sound waves from the vehicle thereby facilitating the ultrasonic sound waves to reflect from objects near the vehicle;
   a camera being attached to said roof rack wherein said camera is configured to capture imagery of the environment surrounding the vehicle;
   a radar sensor being coupled to said roof rack wherein said radar sensor is configured to emit a radar signal for detecting the speed of adjacent traffic vehicles travelling on the same roadway as the vehicle;
   a plurality of telematic devices, each of said telematic devices being attachable to said roof rack, each of said telematic devices performing a unique sensing function with respect to each other thereby facilitating said plurality of telematic devices to enhance the traffic sensing capabilities;
   wherein said roof rack includes a panel extending between a pair of roof engagements, each of roof engagements being positioned on a respective front edge or back edge of said panel, each of said roof engagements extending outwardly beyond said panel, each of said roof engagements having a first end and a second end, each of said roof engagements including a pair of grapples, each of said grapples being positioned on a respective first end and said second end of a respective one of said roof engagements, each of said grapples releasably engaging the roof of the vehicle for attaching said panel to the roof of the vehicle having said panel lying on a horizontal plane; and wherein said ultrasonic sensor has a forward facing surface being elevated above said roof rack and being directed toward said front edge of said panel, said ultrasonic sensor having a send horn being coupled to and extending away from said forward facing surface wherein said send horn is configured to emit the ultrasonic sound waves forwardly from the vehicle, said ultrasonic sensor having a receiving horn being coupled to and extending away from said forward facing surface wherein said receiving horn is configured to receive the ultrasonic sound waves that are reflected from the objects near the vehicle.

3. A traffic monitoring assembly for monitoring traffic in real time over a variety of locations, said assembly comprising:

a roof rack being mountable to a roof of a vehicle wherein said roof rack is configured to be exposed;

a global positioning system transceiver being attached to said roof rack wherein said global positioning system transceiver is configured to receive global positioning system coordinates of the vehicle;

a laser sensor being attached to said roof rack wherein said laser sensor is configured to emit a beam of laser light from the vehicle for detecting the distance between the vehicle and adjacent traffic vehicles traveling on the same roadway as the vehicle;

an ultrasonic sensor being attached to said roof rack wherein said ultrasonic sensor is configured to emit ultrasonic sound waves from the vehicle thereby facilitating the ultrasonic sound waves to reflect from objects near the vehicle;

a camera being attached to said roof rack wherein said camera is configured to capture imagery of the environment surrounding the vehicle;

a radar sensor being coupled to said roof rack wherein said radar sensor is configured to emit a radar signal for detecting the speed of adjacent traffic vehicles travelling on the same roadway as the vehicle;

a plurality of telematic devices, each of said telematic devices being attachable to said roof rack, each of said telematic devices performing a unique sensing function with respect to each other thereby facilitating said plurality of telematic devices to enhance the traffic sensing capabilities;

wherein said roof rack includes a panel extending between a pair of roof engagements, each of roof engagements being positioned on a respective front edge or back edge of said panel, each of said roof engagements extending outwardly beyond said panel, each of said roof engagements having a first end and a second end, each of said roof engagements including a pair of grapples, each of said grapples being positioned on a respective first end and said second end of a respective one of said roof engagements, each of said grapples releasably engaging the roof of the vehicle for attaching said panel to the roof of the vehicle having said panel lying on a horizontal plane; and wherein said camera includes a disk being spaced from said panel, said disk having an outer edge, said camera including a lens extending around said outer edge wherein said lens is configured to capture imagery around 360.0 degrees of the vehicle, said camera being positioned between said ultrasonic sensor and said front edge of said panel.

4. The assembly according to claim 1, wherein:

said assembly includes a communication transmitter being coupled to said roof rack, said communication transmitter being in communication with each of said global positioning system transceiver, said laser sensor, said ultrasonic sensor, said camera and said radar sensor, said communication sensor being in wireless communication with a remote database thereby facilitating data captured from each of said global positioning system transceiver, said laser sensor, said ultrasonic sensor, said camera and said radar sensor to be stored for subsequent analysis; and each of said telematic devices is placed in communication with said communication transmitter when said telematic devices are attached to said roof rack.

5. The assembly according to claim 1, further comprising a power supply being integrated into said roof rack, said power supply being electrically coupled to each of said global positioning system transceiver, said laser sensor, said ultrasonic sensor, said camera, said radar sensor and said communication transmitter, said power supply comprising:

a battery being attached to said panel of said roof rack;

a first solar panel being attached to a first lateral edge of said panel of said roof rack wherein said first solar panel is configured to be exposed to sunlight, said first solar panel being electrically coupled to said battery for charging said battery; and a second solar panel being attached to a second lateral edge of said panel of said roof rack wherein said second solar panel is configured to be exposed to sunlight, said second solar panel being electrically coupled to said battery for charging said battery.

6. A traffic monitoring assembly for monitoring traffic in real time over a variety of locations, said assembly comprising:

a roof rack being mountable to a roof of a vehicle wherein said roof rack is configured to be exposed, said roof rack including a panel extending between a pair of roof engagements, each of roof engagements being positioned on a respective front edge or back edge of said panel, each of said roof engagements extending outwardly beyond said panel, each of said roof engagements having a first end and a second end, each of said roof engagements including a pair of grapples, each of said grapples being positioned on a respective first end and said second end of a respective one of said roof engagements, each of said grapples releasably engaging the roof of the vehicle for attaching said panel to the roof of the vehicle having said panel lying on a horizontal plane;

a global positioning system transceiver being attached to said roof rack wherein said global positioning system transceiver is configured to receive global positioning system coordinates of the vehicle, said global positioning system transceiver including a global positioning system antenna extending upwardly from a top surface of said panel of said roof rack, said global positioning system antenna being positioned adjacent to said back edge of said panel;

a laser sensor being attached to said roof rack wherein said laser sensor is configured to emit a beam of laser light from the vehicle for detecting the distance between the vehicle and adjacent traffic vehicles traveling on the same roadway as the vehicle, said laser sensor extending upwardly from said top surface of said panel of said roof rack, said laser sensor being positioned between said global positioning system transceiver and said front edge of said panel;

an ultrasonic sensor being attached to said roof rack wherein said ultrasonic sensor is configured to emit ultrasonic sound waves from the vehicle thereby facilitating the ultrasonic sound waves to reflect from objects near the vehicle, said ultrasonic sensor extending upwardly from said top surface of said panel of said roof rack, said ultrasonic sensor being positioned between said laser sensor and said front edge of said panel, said ultrasonic sensor having a forward facing surface being elevated above said roof rack and being directed toward said front edge of said panel, said ultrasonic sensor having a send horn being coupled to and extending away from said forward facing surface wherein said send horn is configured to emit the ultrasonic sound waves forwardly from the vehicle, said ultrasonic sensor having a receiving horn being coupled to and extending away from said forward facing surface wherein said receiving horn is configured to receive the ultrasonic sound waves that are reflected from the objects near the vehicle;

a camera being attached to said roof rack wherein said camera is configured to capture imagery of the environment surrounding the vehicle, said camera extending upwardly from said top surface of said panel of said roof rack, said camera including a disk being spaced from said panel, said disk having an outer edge, said camera including a lens extending around said outer edge wherein said lens is configured to capture imagery around 360.0 degrees of the vehicle, said camera being positioned between said ultrasonic sensor and said front edge of said panel;

a radar sensor being coupled to said roof rack wherein said radar sensor is configured to emit a radar signal for detecting the speed of adjacent traffic vehicles travelling on the same roadway as the vehicle, said radar sensor extending upwardly from said top surface of said panel of said roof rack, said radar sensor being positioned between said camera and said front edge of said panel;

a communication transmitter being coupled to said roof rack, said communication transmitter being in communication with each of said global positioning system transceiver, said laser sensor, said ultrasonic sensor, said camera and said radar sensor, said communication sensor being in wireless communication with a remote database thereby facilitating data captured from each of said global positioning system transceiver, said laser sensor, said ultrasonic sensor, said camera and said radar sensor to be stored for subsequent analysis;

a power supply being integrated into said roof rack, said power supply being electrically coupled to each of said global positioning system transceiver, said laser sensor, said ultrasonic sensor, said camera, said radar sensor and said communication transmitter, said power supply comprising:
- a battery being attached to said panel of said roof rack;
- a first solar panel being attached to a first lateral edge of said panel of said roof rack wherein said first solar panel is configured to be exposed to sunlight, said first solar panel being electrically coupled to said battery for charging said battery; and
- a second solar panel being attached to a second lateral edge of said panel of said roof rack wherein said second solar panel is configured to be exposed to sunlight, said second solar panel being electrically coupled to said battery for charging said battery; and a plurality of telematic devices, each of said telematic devices being attachable to said roof rack, each of said telematic devices performing a unique sensing function with respect to each other thereby facilitating said plurality of telematic devices to enhance the traffic sensing capabilities, each of said telematic devices being placed in communication with said communication transmitter when said telematic devices are attached to said roof rack.

7. A traffic monitoring system for monitoring traffic in real time over a variety of locations, said system comprising:

a vehicle being drivable on public roadways, said vehicle having a roof;

a roof rack being mountable to said roof of said vehicle wherein said roof rack is configured to be exposed, said roof rack including a panel extending between a pair of roof engagements, each of roof engagements being positioned on a respective front edge or back edge of said panel, each of said roof engagements extending outwardly beyond said panel, each of said roof engagements having a first end and a second end, each of said roof engagements including a pair of grapples, each of said grapples being positioned on a respective first end and said second end of a respective one of said roof engagements, each of said grapples releasably engaging said roof of said vehicle for attaching said panel to said roof of said vehicle having said panel lying on a horizontal plane;

a global positioning system transceiver being attached to said roof rack wherein said global positioning system transceiver is configured to receive global positioning system coordinates of said vehicle, said global positioning system transceiver including a global positioning system antenna extending upwardly from a top surface of said panel of said roof rack, said global positioning system antenna being positioned adjacent to said back edge of said panel;

a laser sensor being attached to said roof rack wherein said laser sensor is configured to emit a beam of laser light from said vehicle for detecting the distance between said vehicle and adjacent traffic vehicles traveling on the same roadway as said vehicle, said laser sensor extending upwardly from said top surface of said panel of said roof rack, said laser sensor being positioned between said global positioning system transceiver and said front edge of said panel;

an ultrasonic sensor being attached to said roof rack wherein said ultrasonic sensor is configured to emit ultrasonic sound waves from said vehicle thereby facilitating the ultrasonic sound waves to reflect from objects near said vehicle, said ultrasonic sensor extending upwardly from said top surface of said panel of said roof rack, said ultrasonic sensor being positioned between said laser sensor and said front edge of said panel, said ultrasonic sensor having a forward facing surface being elevated above said roof rack and being directed toward said front edge of said panel, said ultrasonic sensor having a send horn being coupled to and extending away from said forward facing surface wherein said send horn is configured to emit the ultrasonic sound waves forwardly from said vehicle, said ultrasonic sensor having a receiving horn being coupled to and extending away from said forward facing surface wherein said receiving horn is configured to receive the ultrasonic sound waves that are reflected from the objects near said vehicle;

a camera being attached to said roof rack wherein said camera is configured to capture imagery of the environment surrounding said vehicle, said camera extending upwardly from said top surface of said panel of said roof rack, said camera including a disk being spaced from said panel, said disk having an outer edge, said camera including a lens extending around said outer edge wherein said lens is configured to capture imagery around 360.0 degrees of said vehicle, said camera being positioned between said ultrasonic sensor and said front edge of said panel;

a radar sensor being coupled to said roof rack wherein said radar sensor is configured to emit a radar signal for detecting the speed of adjacent traffic vehicles travelling on the same roadway as said vehicle, said radar sensor extending upwardly from said top surface of said panel of said roof rack, said radar sensor being positioned between said camera and said front edge of said panel;

a communication transmitter being coupled to said roof rack, said communication transmitter being in communication with each of said global positioning system transceiver, said laser sensor, said ultrasonic sensor, said camera and said radar sensor, said communication sensor being in wireless communication with a remote database thereby facilitating data captured from each of said global positioning system transceiver, said laser sensor, said ultrasonic sensor, said camera and said radar sensor to be stored for subsequent analysis;

a power supply being integrated into said roof rack, said power supply being electrically coupled to each of said global positioning system transceiver, said laser sensor, said ultrasonic sensor, said camera, said radar sensor and said communication transmitter, said power supply comprising:

a battery being attached to said panel of said roof rack;

a first solar panel being attached to a first lateral edge of said panel of said roof rack wherein said first solar panel is configured to be exposed to sunlight, said first solar panel being electrically coupled to said battery for charging said battery; and a second solar panel being attached to a second lateral edge of said panel of said roof rack wherein said second solar panel is configured to be exposed to sunlight, said second solar panel being electrically coupled to said battery for charging said battery; and a plurality of telematic devices, each of said telematic devices being attachable to said roof rack, each of said telematic devices performing a unique sensing function with respect to each other thereby facilitating said plurality of telematic devices to enhance the traffic sensing capabilities, each of said telematic devices being placed in communication with said communication transmitter when said telematic devices are attached to said roof rack.

* * * * *